(12) United States Patent
Chebli et al.

(10) Patent No.: US 8,915,129 B2
(45) Date of Patent: Dec. 23, 2014

(54) TIRE CARCASS CABLE DEPTH GAUGE AND METHOD OF USE

(75) Inventors: Adib T. Chebli, Greer, SC (US); Metodi L. Ikonomov, Moore, SC (US)

(73) Assignee: Michelin Recherche et Technique S.A., Grages-Paccot (CH)

( * ) Notice: Subject to any disclaimer, the term of this patent is extended or adjusted under 35 U.S.C. 154(b) by 316 days.

(21) Appl. No.: 13/378,256

(22) PCT Filed: Jun. 15, 2009

(86) PCT No.: PCT/US2009/047323
§ 371 (c)(1),
(2), (4) Date: Dec. 14, 2011

(87) PCT Pub. No.: WO2010/147577
PCT Pub. Date: Dec. 23, 2010

(65) Prior Publication Data
US 2012/0085159 A1    Apr. 12, 2012

(51) Int. Cl.
*E01C 23/00* (2006.01)
*G01M 17/02* (2006.01)
*G01B 3/28* (2006.01)

(52) U.S. Cl.
CPC .................................... *G01B 3/28* (2013.01)
USPC ............................................................ 73/146

(58) Field of Classification Search
CPC ..................................................... G01B 3/28
USPC .......... 73/146, 152, 146.2, 152.17, 152.56, 8;
33/203, 485, 562, 836, 203.11, 574,
33/679, 284, 301, 302, 492, 719, 501.05,
33/501.08, 501.45, 437, 490, 494, 542,
33/545, 666, 679.1, 700, 729, 740;
152/151, 154.2, 370; 116/28, 34, 47,
116/200, 224, 225, 235, 242, 248, 259, 272,
116/280, 281, 287, 291, 292, 300, 304, 315,
116/317, 323, 326, 332, 334; 156/95, 97
See application file for complete search history.

(56) References Cited

U.S. PATENT DOCUMENTS 71,719 A * 12/1867 Douglass ........................ 33/490
2,579,664 A * 12/1951 Gleasman ...................... 33/492

(Continued)

FOREIGN PATENT DOCUMENTS

| EP | 1 374 784 B1 | 7/2008 |
|---|---|---|
| WO | 20071047466 A1 | 4/2007 |

OTHER PUBLICATIONS

PCT/US2009/047323 International Search Report and Written Opinion dated Aug. 4, 2009, 9 pgs.

*Primary Examiner* — Hezron E Williams
*Assistant Examiner* — Marrit Eyassu
(74) *Attorney, Agent, or Firm* — Hahn Loeser & Parks, LLP; Bret Hrivnak

(57) ABSTRACT

A cable depth gauge and method for determining the depth of a cable embedded in a sidewall of a tire, the cable depth gauge comprising an elongate body having a proximal end and a distal end, the proximal end having an indicator point set to reference a surface of the tire, the elongate body having a width to determine eligibility if the repair hole being examined meets the minimum size for the repair process and a first measuring region and a second measuring region located at the proximal end of the elongate body, the first measuring region and the second measuring region being at a known distance from the indicator point.

9 Claims, 3 Drawing Sheets

(56) References Cited

U.S. PATENT DOCUMENTS

| | | | |
|---|---|---|---|
| 4,234,256 A * | 11/1980 | Yeager | 356/458 |
| 4,980,902 A * | 12/1990 | Hegland et al. | 378/61 |
| 5,247,981 A * | 9/1993 | Benedicto et al. | 152/370 |
| 5,536,346 A * | 7/1996 | Hendry et al. | 156/97 |
| 5,943,974 A * | 8/1999 | Hoag | 112/475.01 |
| 7,497,113 B1 * | 3/2009 | Patel | 73/146 |
| 2003/0233098 A1 * | 12/2003 | Markworth | 606/96 |
| 2008/0229598 A1 * | 9/2008 | Liu | 33/562 |

\* cited by examiner

TIRE CARCASS CABLE DEPTH GAUGE AND METHOD OF USE

This application is a National Stage application of International Application No. PCT/US2009/047323, filed Jun. 15, 2009, to which this application claims priority and the benefit of, the disclosure of which is also hereby incorporated by reference.

BACKGROUND OF THE INVENTION

1. Field of the Invention

The invention relates generally to tire repair and more specifically to determining the location of metal cables in the tire sidewall to establish appropriate depth for any surface treatment or repair.

2. Description of the Related Art

Steel cord is used in the body ply and belts of truck tires. These steel cords, also known as cables, are located in the tire sidewall. When repairing an injury to a tire sidewall, the injured area may be buffed or ground to remove material and prepare the area for patch application or repair. Cables may be located at various depths within the sidewall depending upon the dimension of the tire, its architecture, its type and usage, its manufacturer, and the production parameters and conditions. During the repair operation of the tire, it is crucial to avoid damaging or disturbing the undamaged metal cables that are adjacent to the injury and/or that fall within the repair area.

Various electromagnetic mechanisms are known for determining metal cable depth; however, these mechanisms are complex and require calibration to specific tire types. A low technology, easy to use apparatus is needed to quickly and definitively classify cable depth in individual tires without the necessity of calibration.

SUMMARY OF THE INVENTION

Particular embodiments of the present invention include a cable depth gauge for determining the depth of a cable embedded in a sidewall of a tire. The cable depth gauge comprises an elongate body having a proximal end and a distal end. The proximal end having an indicator point set to reference a surface of the tire. The elongate body having a width to determine eligibility if the repair hole being examined meets the minimum size for the repair process and a first measuring region and a second measuring region located at the proximal end of the elongate body. The first measuring region and the second measuring region being at a known distance from the indicator point.

Particular embodiments of the present invention include a method for determining the depth of a cable embedded in a sidewall of a tire. The method comprises the steps of inserting the cable depth gauge into a repair hole formed through a tire, positioning the indicator point of the cable depth gauge at a surface of the tire, determining whether the cable falls within the first measuring region, the second measuring region or beyond the second measuring region and classifying the depth of the cable as shallow if the cable falls within the first measuring region, medium if the cable falls within the second measuring region or deep if the cable falls beyond the second measuring region.

Particular embodiments of such methods may further include selecting an appropriate setting on a subsequent operation based upon the classified depths.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Embodiments of the present invention include a cable depth gauge and methods of use. A cable depth gauge to classify cable depth as shallow, medium and deep would be extremely useful in processes to prepare a tire for repair. It is important in these processes to grind or treat the surface close to the cables without damaging or disturbing the undamaged cables. The cable depth classification may be used to determine depth of grinding or treatment.

Figure 1:
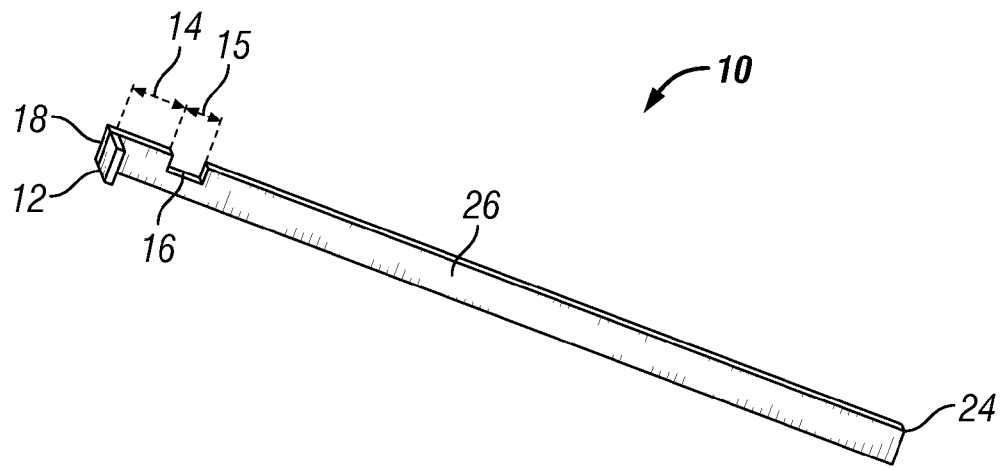
FIG. 1 is a front perspective view of an embodiment of the cable depth gauge.
Figure 2:
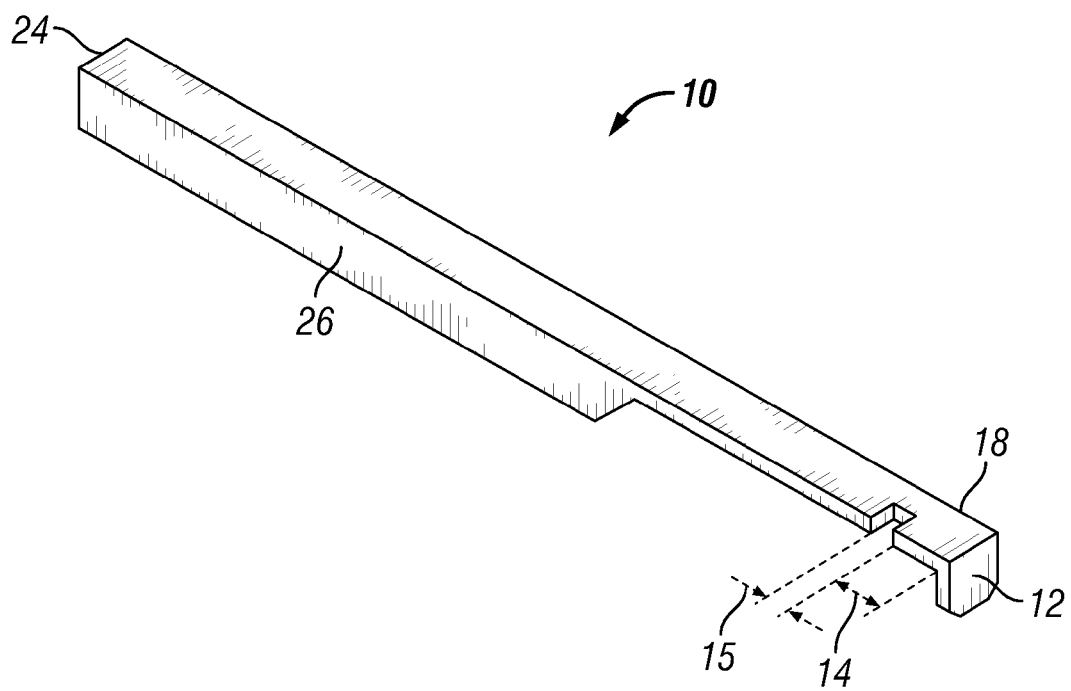
FIG. 2 is a side perspective view of another embodiment of the cable depth gauge.

Referring to FIGS. 1 and 2, a cable depth gauge 10 configured pursuant to a particular embodiment of the invention is formed of any suitable known materials such as plastic or steel. The gauge 10 includes an elongate body 26 having a proximal end 18 and a distal end 24. The distal end 24 may be fashioned as shown, i.e. an extension of the elongate body 26 or may include an expanded width region for ease of gripping. The elongate body 26 has an indicator point 12, a first measuring region 14 and a second measuring region 15 located at the proximal end 18 of the elongate body 26.

The gauge 10 must be long enough to be partially inserted through a repair section of a tire sidewall where the sidewall cords or cables have been exposed while being held securely in one's hand. In one embodiment, for example, the length of the gauge may be between 6 cm and 20 cm. The width dimension of the gauge 10 is dependent upon the minimum hole size permitted by the repair specifications of the repair process that requires the use of the cable depth gauge. The width dimension of the gauge thus limits the insertion of the gauge into holes having a size that is inferior to the repair specifications of the process of interest. In one embodiment, the gauge has a width of about 4 mm. It is understood that in particular embodiments, the width of the gauge 10 may range, for example, between 3 mm and 30 mm depending upon the repair process specifications. The embodiment of the gauge illustrated in the drawings is rectangular in shape; however, almost any shape may be appropriate for this application.

The indicator point 12 located on the proximal end 18 of the gauge 10 catches or aligns on the inside (for the exemplary embodiment) of the tire sidewall to locate the gauge at that known position. In the illustrated embodiment, the indicator point 12 may be a tab that extends perpendicular to the elongate body 26 to physically catch on the inner sidewall surface of the tire being repaired. In the illustrated embodiment, the tab height is 3 mm but this is not a critical height constraint.

The tab may be any shape, length and thickness sufficient to enter the repair hole and couple to the inner sidewall surface of the tire.

This invention is not limited to the illustrated embodiment. In other particular embodiments, the indicator point 12 may be, for example, merely an indication line, a mark or color coding on the elongate body set to reference an inner or outer surface of the tire. As such, the surface referenced may be the inner surface or the outer surface of the tire. Thus, the elongate body 26 may be configured to classify the depth of the cables from the inside of the tire or from the outside of the tire.

The depth regions are determined by evaluating placement of metal cables in many tires from various manufacturers. The following depth regions were determined, for example, using truck tires. The depth regions will vary depending on the size of the class of the tire, such as, for example an off road tire will have different measuring regions compared to a truck tire. In particular embodiments, the first measuring region 14 extends from the indicator point 12 to the edge of the second measuring region 15. The first measuring region 14 may be designated as the shallow cable depth region (for the exemplary embodiment). In a particular embodiment, the length of the first measuring region 14 is, for example, between 3.0 mm and 4.0 mm. In another embodiment, the length of the first measuring region is about 3.5 mm.

The second measuring region 15 extends beyond the length of the first measuring region 14. The first and second measuring regions 14, 15 may be marked, labeled or color coded to indicate the regions. In one embodiment the second measuring region 15 is a notch 16. The second measuring region 15 may be designated as the medium depth region (for the exemplary embodiment). In a particular embodiment, the length of the second measuring region 15 is, for example, between 1.0 mm and 2.0 mm. In another embodiment, the length of the second measuring region is about 1.8 mm. Any cable positions in the repair section of the tire that are observed beyond the second measuring region 15 may be designated as the deep depth region (for the exemplary embodiment).

Figure 3:
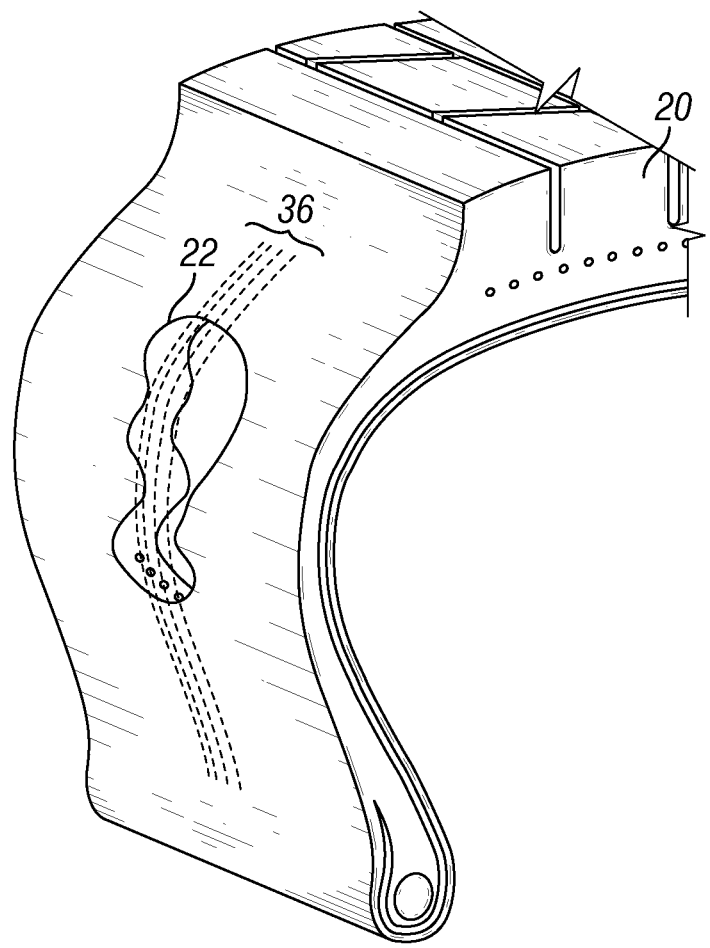
FIG. 3 is a schematic view of the positioning of the cable depth gauge into a tire with an injury.

A tire may receive an injury from road debris that causes a puncture or rupture of the rubber sidewall. It is commonly recommended for preparing the injury for repair that a clean hole be drilled or ground at the injury site. With reference to FIG. 3, a portion of a tire 20 is depicted, the tire 20 having an injury and repair hole 22 in the sidewall. Particular embodiments of methods of determining the depth of a cable embedded in a tire sidewall include producing a repair hole in the sidewall of a tire and inserting a cable depth gauge into a repair hole formed through a tire. The cable depth gauge may be inserted from the inside or the outside of the tire. Particular embodiments of the invention are shown inserting the cable depth gauge from the outside of the tire.

Figure 4:
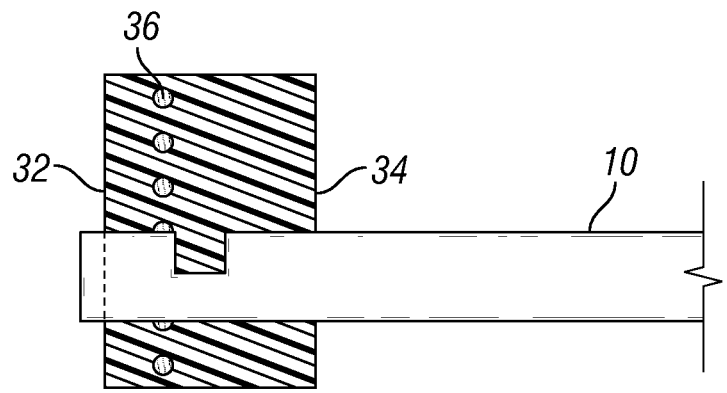
FIG. 4 is an enlarged cross sectional view of the tire sidewall and the gauge measuring shallow depth cables.
Figure 5:
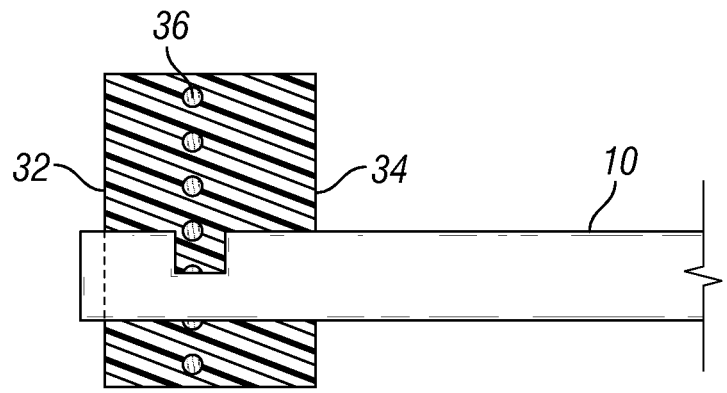
FIG. 5 is an enlarged cross sectional view of the tire sidewall and the gauge measuring medium depth cables.
Figure 6:
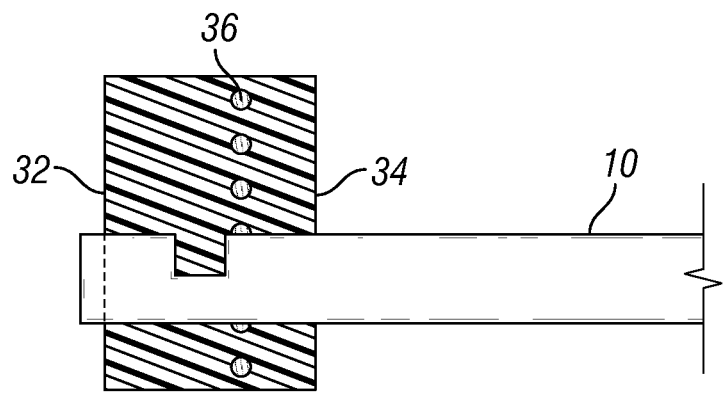
FIG. 6 is an enlarged cross sectional view of the tire sidewall and the gauge measuring deep depth cables.

Referring to FIGS. 4, 5 and 6, the steps of positioning and reading the cable depth gauge for particular embodiments of the invention are illustrated. Of course if the reference indicator point 12 has aligned with the outer surface, then the cable depth gauge would have to have different first and second measuring region locations. The cable depth gauge 10 is inserted in the repair hole 22 from the outside 34 of the tire. Then the cable depth gauge is positioned in a reference position using an indicator point 12 on the end of the cable depth gauge 10. The cable depth gauge 10 is inserted through the sidewall then pulled back toward the outside of the tire until the indicator point 12 aligns on the interior surface 32 of the sidewall. The depth of the cables 36 may be read in relation to the first measuring region 14 and the second measuring region 15 on the proximal end of the cable depth gauge 10.

In particular embodiments of the invention, the depth of the cables may be classified as shallow, medium or deep in relation to the interior surface 32 of the tire. FIG. 4 illustrates a shallow depth classification where the metal cables are positioned in the first measuring region 14. FIG. 5 illustrates a medium depth classification where the metal cables are positioned in the second measuring region 15. FIG. 6 illustrates a deep depth classification where the metal cables are positioned beyond the second measuring region 15.

The method of using the cable depth gauge to determine the depth of metal cable embedded in a tire sidewall may further include selecting an appropriate setting on any subsequent operations to reflect the depth of the cables. For example, a grinding operation may be set to shallow, medium or deep grind levels depending upon the classification determined using this method and apparatus.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A method for determining a depth of cable embedded in a sidewall of a tire, the method comprising:

inserting a cable depth gauge into a repair hole formed through a tire, the cable depth gauge comprising:

an elongated body having a proximal end having an indicator point set to reference a surface of the tire, the elongated body having a width sized to determine eligibility if the repair hole being examined meets a minimum size for a repair process, and a first measuring region and a second measuring region located at the proximal end of the elongated body, each of the first measuring region and the second measuring region being arranged at a known distance from the indicator point and defining a range of distances pertaining to a distinct depth classification, the second measuring region being arranged adjacent the first measuring region along the elongate body, where the second measuring region is located a greater distance from the indicator point than the first measuring region;

positioning the indicator point of the cable depth gauge at a surface of the tire;

determining whether the cable falls within the first measuring region, the second measuring region or beyond the second measuring region; and classifying the depth of the cable as being within a first classification if the cable falls within the first measuring region, being within a second depth classification indicating a cable depth greater than the first depth classification if the cable falls within the second measuring region or being within a third depth classification indicating a cable depth greater than the second classification if the cable falls beyond the second measuring region.

2. The method of claim 1, further comprising: performing a grinding operation selected to grind into the tire from the surface by a depth commensurate with the depth classified in the step of classifying.

3. The method of claim 1, wherein the second measuring region is a notch in the elongate body.

4. The method of claim 1, wherein the indicator point is a tab.

5. The method of claim 4, wherein the tab extend perpendicular to the elongate body.

6. The method of claim 1, wherein the first measuring region is between 3.0 mm and 4.0 mm.

7. The method of claim 1, wherein the width of the elongate body at the proximal end is between 2 mm and 6 mm.

8. The method of claim 1, wherein the surface to which the indicator point is set to reference is an inner surface of the tire.

9. The method of claim 1, wherein the first measuring region is adjacent the indicator point.

* * * * *